United States Patent
Eberle (10) Patent No.: US 7,561,875 B1
(45) Date of Patent: Jul. 14, 2009

(54) METHOD AND APPARATUS FOR WIRELESSLY TESTING FIELD-REPLACEABLE UNITS (FRUS)

(75) Inventor: Hans Eberle, Mountain View, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 659 days.

(21) Appl. No.: 10/840,849

(22) Filed: May 7, 2004

Related U.S. Application Data (60) Provisional application No. 60/512,270, filed on Oct. 16, 2003.

(51) Int. Cl.
*H04W 24/00* (2009.01)

(52) U.S. Cl. .................. 455/423; 455/424; 455/425; 455/41.2; 455/67.11; 455/67.14; 455/556.1; 455/557; 702/58; 702/59; 702/62; 702/182; 702/183; 702/184; 702/185

(58) Field of Classification Search ................ 455/41.2, 455/423–425, 67.11, 14, 90.1–90.2, 556.1–556.2, 455/557, 67.14; 707/100; 702/34, 118, 183–185, 702/57–65, 108, 117–122
See application file for complete search history.

(56) References Cited

U.S. PATENT DOCUMENTS

| | | | | |
|---|---|---|---|---|
| 5,253,184 | A * | 10/1993 | Kleinschnitz | 702/184 |
| 6,684,180 | B2 * | 1/2004 | Edwards et al. | 702/184 |
| 6,901,344 | B2 * | 5/2005 | Mantey et al. | 702/122 |
| 6,976,197 | B2 * | 12/2005 | Faust et al. | 714/723 |
| 2002/0138235 | A1 * | 9/2002 | Edwards et al. | 702/184 |
| 2003/0217067 | A1 * | 11/2003 | Gilstrap et al. | 707/100 |
| 2004/0239979 | A1 * | 12/2004 | Parry | 358/1.15 |
| 2004/0253922 | A1 * | 12/2004 | deBlanc et al. | 455/41.1 |

* cited by examiner

*Primary Examiner*—Tuan A Tran
(74) *Attorney, Agent, or Firm*—Park, Vaughan & Fleming LLP; Edward J. Grundler (57) ABSTRACT

One embodiment of the present invention provides a system that facilitates wirelessly identifying and testing field-replaceable units within a computer system. The system includes a field-replaceable unit (FRU) within the computer system and a storage device located on the FRU. Data on the storage device contains an identifier for the FRU. A wireless transceiver coupled to the storage device is configured to receive a request directed to the FRU and, in response to the request, to transmit the identifier for the FRU.

24 Claims, 10 Drawing Sheets

METHOD AND APPARATUS FOR WIRELESSLY TESTING FIELD-REPLACEABLE UNITS (FRUS)

RELATED APPLICATION

This application hereby claims priority under 35 U.S.C. §119 to U.S. Provisional Patent Application No. 60/512,270, filed on 16 Oct. 2003, entitled "Testing Systems Wirelessly," by inventor Hans Eberle, which is incorporated herein by reference.

This application is a continuation-in-part of a pending U.S. patent application, entitled "Radio Communication within a Computer System," by inventors Jose M. Cruz-Albrecht, Han Eberle, and Neil C. Wilhelm, Ser. No. 09/873,146, filed 1 Jun. 2001, which is incorporated herein by reference. This application hereby claims priority under 35 U.S.C. §120 to the above-listed patent application.

BACKGROUND

1. Field of the Invention

The present invention relates to techniques for testing computer systems. More specifically, the present invention relates to a method and an apparatus for communicating with a field-replaceable unit (FRU) within a computer system in order to test the FRU.

2. Related Art

Modern computing systems are comprised of many devices and subsystems, including circuit boards, power supplies, and disk drives. These devices and subsystems are typically coupled together by buses for testing, configuration, and fault reporting. For example, a computer system often includes a joint test action group (JTAG) bus, which can be used to identify a device, to program the device, to insert test vectors into the device, and to read test results from the device.

Using a bus structure to communicate with each device within the computer system requires wires to carry the bus signals and connectors to couple the signals onto and off of the circuit board. These wires and connectors adversely impact the cost and reliability of the system.

Wired test structures exhibit many unwanted dependencies: they typically use hierarchical and daisy-chained wiring, and they share interconnects and backplanes with the system under test. As a result, faults can easily lead to incomplete or erroneous test reports on properly working components.

The JTAG bus is a serial bus, which is daisy-chained through the components on a circuit board and forms a very large shift register. As a test vector or a configuration vector is shifted into a component, data in the component, such as a test result or a component identifier, is shifted out of the component. Multiplexer-demultiplexers are typically used to access multiple components.

Figure 1A:
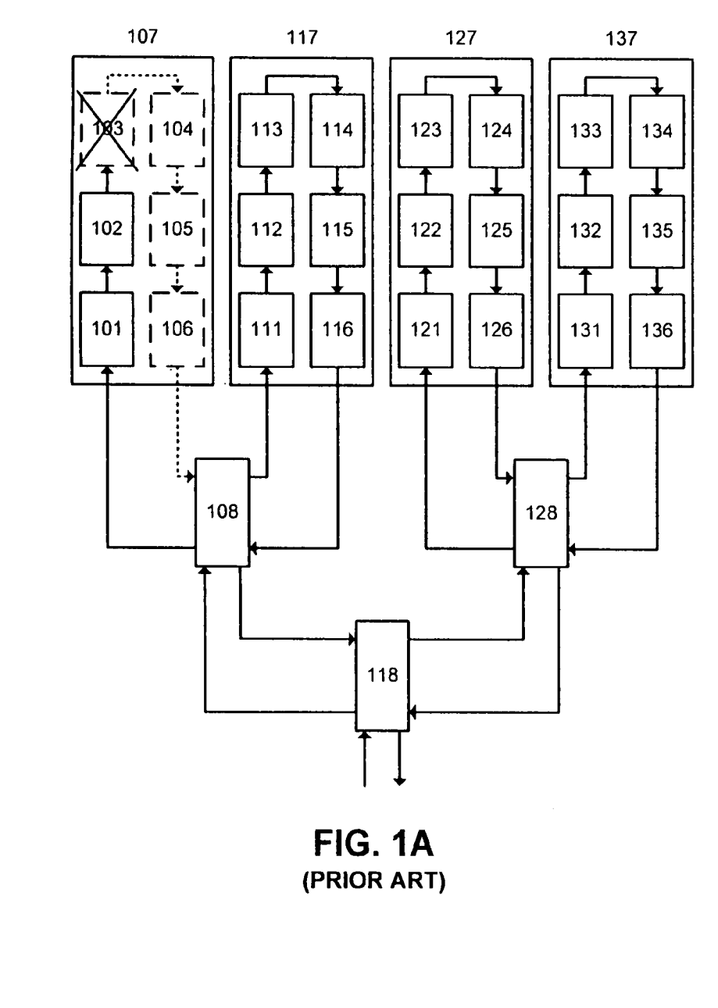
FIG. 1A illustrates circuit boards being addressed by a serial bus.
Figure 1B:
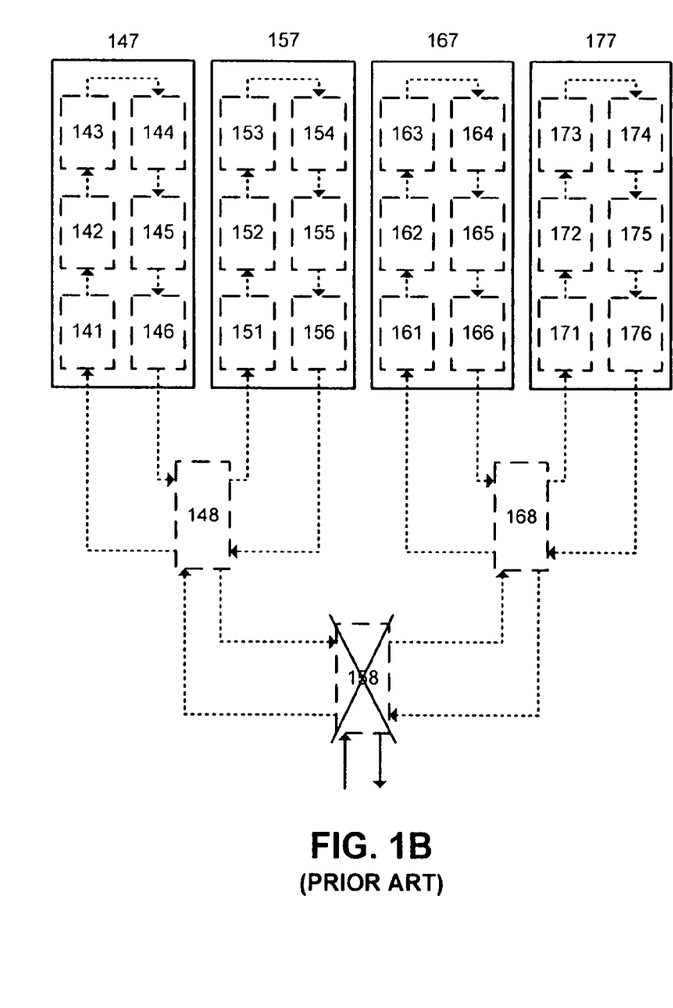
FIG. 1B illustrates circuit boards being addressed by a serial bus.

FRU IDs are used to configure, identify, and diagnose problems with associated FRUs. Unfortunately, the FRU IDs may not be accessible when components fail because of dependencies created by the wired interconnect used to access FRU IDs. FIGS. 1A and B show examples of possible failure scenarios of wired interconnects that illustrate such dependencies. In FIG. 1A, a faulty component breaks the daisy chain and, as a result, all components later in the daisy chain become inaccessible although they might be fully functional. In FIG. 1B, a hierarchy of bridges is used to increase fan-in and fan-out so that a large number of components can be interconnected. Note that any failure of a bridge causes the corresponding sub-tree to become inaccessible even though the nodes and leaves of the sub-tree might be fully functional.

FIG. 1A illustrates circuit boards being addressed by a serial bus. The system shown in FIG. 1A includes circuit boards 107, 117, 127, and 137. Note that these circuit boards are referred to as field replaceable units or FRUs. A FRU is an entity that a technician in the field replaces if defective components need to be replaced or if units need to be upgraded. Note also that the FRUs are not limited to circuit boards, but can include any type of active component within a system. In FIG. 1A, circuit board 107 includes devices 101-106, circuit board 117 includes devices 111-116, circuit board 127 includes devices 121-126, and circuit board 137 includes devices 131-136. Multiplexer-demultiplexers 108, 118, and 128 are used to combine the signals associated with circuit boards 107, 117, 127, and 137. Specifically, multiplexer-demultiplexer 108 combines the signals associated with circuit boards 107 and 117, multiplexer-demultiplexer 128 combines the signals associated with circuit boards 127 and 137, and multiplexer-demultiplexer 118 combines the signals associated with multiplexer-demultiplexers 108 and 128.

In addition to the problem of providing the wiring and connections for this serial interface, a failure in the serial portion of one of the devices, for example device 103, precludes signals from circuit board 107 from being shifted into devices 104-106 or shifted out of devices 101 and 102.

FIG. 1B illustrates circuit boards being addressed by a serial bus. The system shown in FIG. 1B includes circuit boards 147, 157, 167, and 177. Circuit board 147 includes devices 141-146, circuit board 157 includes devices 151-156, circuit board 167 includes devices 161-166, and circuit board 177 includes devices 171-176. Multiplexer-demultiplexers 148, 158, and 168 are used to access signals associated with circuit boards, 147, 157, 167, and 177. Specifically, multiplexer-demultiplexer 148 accesses the signals associated with circuit boards 147 and 157, multiplexer-demultiplexer 168 accesses the signals associated with circuit boards 167 and 177, and multiplexer-demultiplexer 158 accesses the signals associated with multiplexer-demultiplexers 148 and 168.

Note that a failure of multiplexer-demultiplexer 158 prevents signals from being shifted onto or out of circuit boards 147, 157, 167, and 177. This failure, therefore, prevents reading the status or the identity of the affected circuit boards, and also prevents entering test vectors and reading the results from the affected circuit boards.

Hence, what is needed is an apparatus and a method for identifying and testing field replaceable units without the problems described above.

SUMMARY

One embodiment of the present invention provides a system that facilitates wirelessly identifying and testing field-replaceable units within a computer system. The system includes a field-replaceable unit (FRU) within the computer system and a storage device located on the FRU. Data on the storage device contains an identifier for the FRU. A wireless transceiver coupled to the storage device is configured to receive a request directed to the FRU and, in response to the request, to transmit the identifier for the FRU.

In a variation of this embodiment, the wireless transceiver is additionally configured to transmit data associated with the FRU.

In a further variation, the storage device includes a serial electrically-erasable programmable read-only memory.

In a further variation, data on the storage device contains error logs for the FRU.

In a further variation, the system includes at least one physical sensor coupled to the wireless transceiver that is configured to monitor a parameter such as temperature, voltage, or current for the FRU.

In a further variation, the physical sensor creates a log of the monitored parameter within the storage device.

In a further variation, the wireless transceiver initiates a wireless transfer when the at least one physical sensor measures a data reading that exceeds a given range.

In a further variation, the storage device and wireless transceiver receive power from a power source for the FRU.

In a further variation, the storage device and wireless transceiver receive power from a battery, which is separate from the power source for the FRU.

In a further variation, the storage device and wireless transceiver receive power from a radio frequency signal received by the wireless transceiver.

In a further variation, the system includes a joint test action group (JTAG) interface coupled to the wireless transceiver that is configured to test the FRU under control of signals received by the wireless transceiver.

In a further variation, data within the storage device is updated using the transceiver.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Overview

Replacing wired test structures with wireless test structures offers many advantages. Most importantly, by using a communication infrastructure that is orthogonal to the one used for regular system operation, the testee and the tester are completely decoupled. Otherwise, if, for example, wired test structures share connectors and backplanes with the system under test, a fault of a shared component easily affects the accuracy of the test results.

Being a broadcast medium, wireless communication further removes dependencies found in wired interconnects that use hierarchical wiring and daisy chains. Thus, faults cannot affect properly working components and lead to misdiagnosis referred to as No Trouble Found (NTF).

Wireless communication provides a direct connection between a tester and a testee. There are no indirections that are, for example, found in systems that use daisy-chained or hierarchical wiring. In these systems, a failure of an intermediate node makes any dependent node inaccessible thereby preventing the system controller from determining the state of all components.

Figure 3:
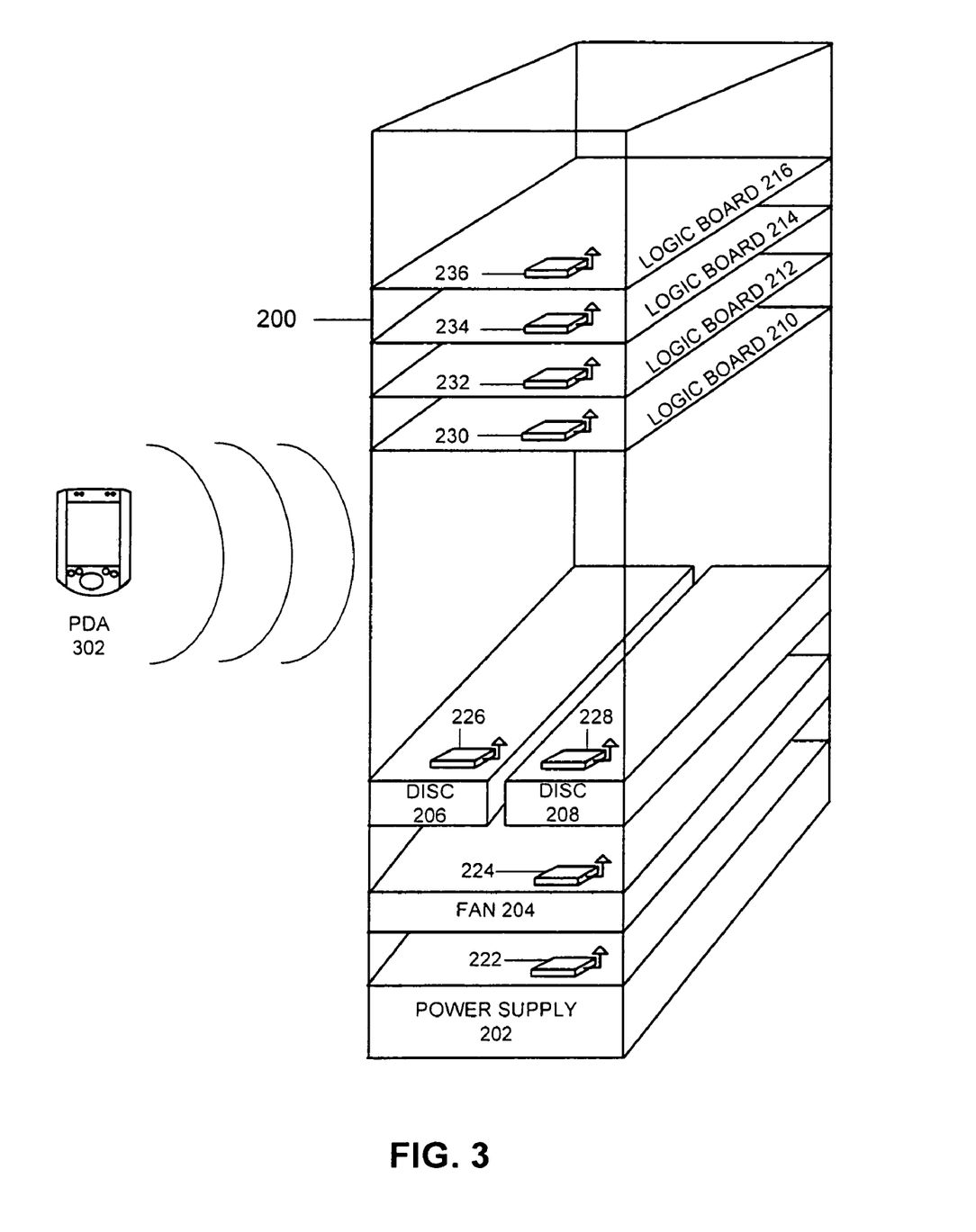
FIG. 3 illustrates an external device communicating with a computer system in accordance with an embodiment of the present invention.
Figure 4:
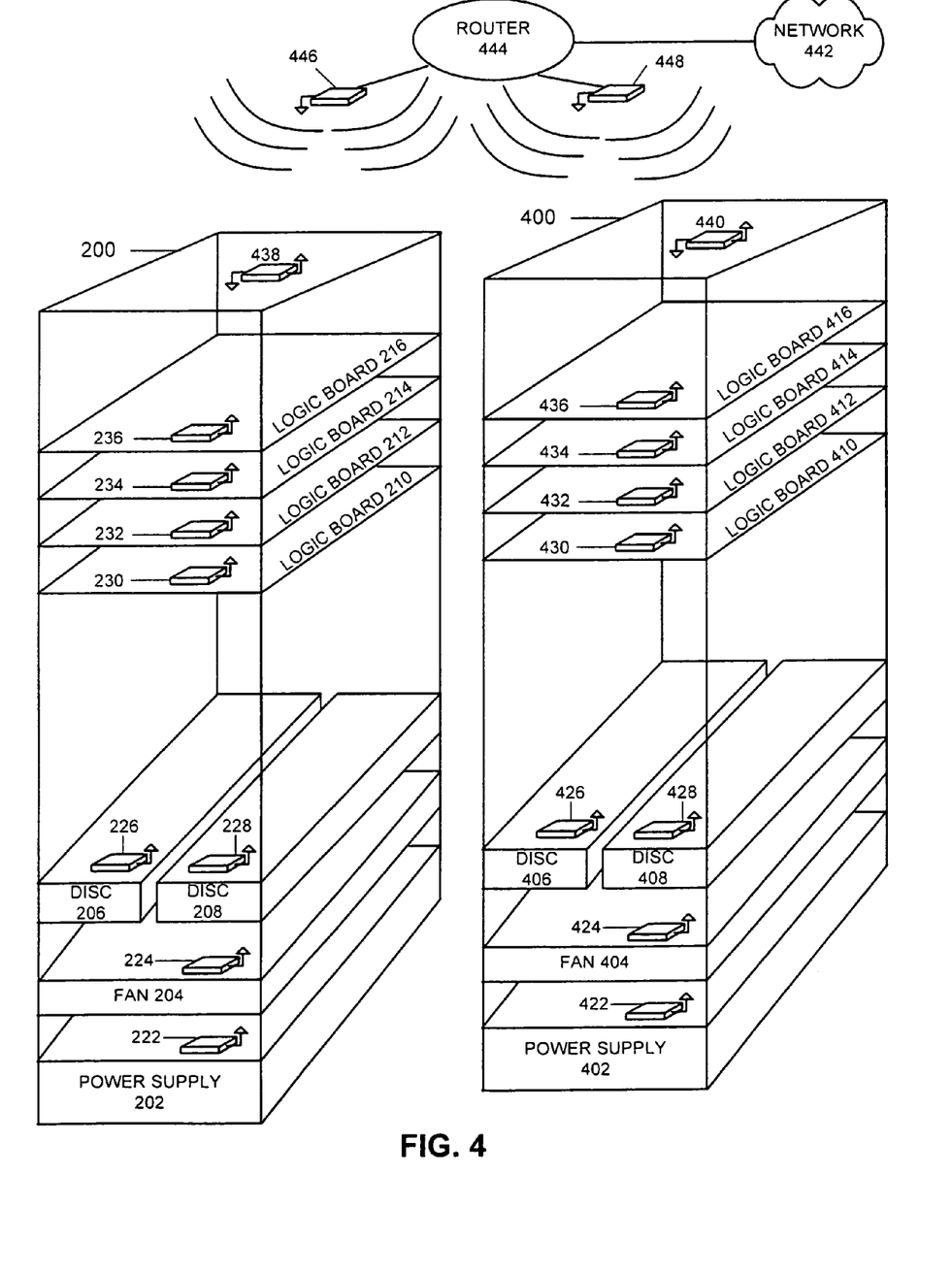
FIG. 4 illustrates a configuration that facilitates remote access to multiple computer systems in accordance with an embodiment of the present invention.

An example of a scan path such as JTAG using traditional wiring techniques is shown in FIG. 1A and an alternative design using wireless communication is shown in FIGS. 3 and 4. The wired scan paths connecting the chips on a daughter card are linked serially in the form of a daisy chain. A bridge on the mother board connects the daisy chains of the daughter cards. A large system might employ additional levels of hierarchy as shown in FIGS. 1A and 1B in that the daisy chains are connected in a tree-like structure where the daisy chains are the leaves and the bridges are the nodes. Such a topology contains many unwanted dependencies. FIGS. 1A and 1B illustrate examples of possible failure scenarios caused by these dependencies.

If a failure of a chip on the daughter card breaks the daisy chain, all chips that come later in the chain become inaccessible even though they might be fully functional. Assuming a hierarchy of bridges, a failure of a bridge causes the corresponding sub-tree to become inaccessible even though the nodes and leaves of the sub-tree might be fully functional.

System availability can be improved by employing redundancy. Still, if components and wires are simply replicated, as is standard practice today, we can expect similarities in failure behavior.

Wireless communication is non-intrusive since it does not rely on any physical cabling. Thus, it is a particularly attractive alternative for any task that requires a physical communication link to be temporarily connected to the system. Connecting cables typically requires manual intervention which can be error-prone and time-consuming. Wireless communication removes these shortcomings. Moreover, it offers an efficient way to automate these tasks.

Physical interconnect technologies using cables and connectors are inherently unreliable. Causes are manifold: wires are improperly connected in the first place or become loose through wear and tear, while connectors and their contacts become corroded and worn. Thus, a wireless interconnect offers higher reliability than a physical interconnect.

To ease repair and upgrade of system components, high-end computer systems are commonly modularized into field-replaceable units (FRUs). By subdividing systems into FRUs, components can be replaced by a technician or a user in the field without requiring the costly replacement of the entire system. Also, fewer parts are replaced thus reducing the cost of the replacement hardware. More importantly, system downtime is minimized. System availability can be further improved by allowing for hot-pluggable and redundant FRUs.

To help with maintaining system information, FRUs are equipped with FRU IDs that store information on the FRU. A FRU ID is implemented with a nonvolatile memory such as an EEPROM. Typical capacities of FRU ID memories are in the order of 8 Kbyte. This information can be used to determine the characteristics and the state of the FRU. FRU IDs contain static data written at manufacturing time and dynamic data updated over the course of the FRU's lifetime. Examples of static data are manufacturing information and FRU specifications. Examples of dynamic data are revision history or log files reporting sensor readings or captured error reports.

FRU ID technology is currently employed mostly in high-end server systems. The technology is, for example, used by the Intelligent Platform Management Interface (IPMI) to manage modular system platforms.

Wireless FRU IDs offer many advantages. They improve serviceability by removing the dependencies of a wired interconnect. Traditionally, the wiring used to interconnect FRU IDs resembles a tree with hierarchical wiring used higher up the tree and daisy-chains used to connect the leaf nodes. As explained before, faulty segments in such an interconnect can easily affect nodes that are fully functional in that they become unreachable. As a result, unreachable nodes are reported as malfunctioning causing a technician to replace a FRU that is not broken. This incident is known as no trouble found (NTF)—it refers to the replacement of a fully functional FRU that was mistakenly diagnosed as faulty.

Wireless FRU IDs also make it easier to access FRU IDs as no wiring and no cabling is required. We will later describe an application scenario where a field technician accesses FRU ID information through a wireless PDA.

Wireless FRU IDs further enable new applications such as advanced tracking. Systems need to be tracked all along the way from the manufacturing floor to the customer's premises. Systems are typically built to order. To verify that a system is assembled according to the customer's specifications, manufacturers scan the identity of the system modules using bar codes. With wireless FRU IDs, this process can be simplified in that the configuration can be determined wirelessly without requiring an optically readable bar code and a line of sight between the bar code and the reader.

Wireless FRU IDs also automate inventory tracking at the customers' premises. The data gathered through the wireless FRU IDs can be used to maintain the inventory database of the customer as well as of the field service organization. Having accurate and current information on the FRUs simplifies system maintenance and administration. For example, compatibility conflicts can be easily determined knowing the exact revision history of all FRUs.

There are similarities between wireless FRU IDs and RFID tags. RFID tags are, however, less capable in that they only store a small amount of static data—the memory capacity today is 96 bits. This data is stored at manufacturing time and cannot be updated. Further, RFID tags are passive, that is, they can only transmit data when powered by the electromagnetic field generated by an RFID reader, whereas wireless FRU IDs can initiate transfers, for example, to report on changes of their dynamic data contents.

While the testing and tracking capabilities described here mostly apply to today's high-end systems used by enterprise and scientific users, we can expect that, thanks to commodization, similar capabilities will eventually be incorporated into low-end and high-volume systems.

One embodiment of the present invention implements a prototype of the application scenario illustrated in FIG. 3 where a PDA accesses FRU IDs by wireless communication.

This embodiment uses a Palm III PDA (master) that is equipped with a wireless gateway to communicate with the FRU ID (slave). The FRU ID is located on a FRU such as the system motherboard of the system under test. The FRU ID has been modified so that it has two ports: there is a regular wire interface to provide backwards compatibility and, in addition, there is a radio port so that FRU ID data can also be accessed wirelessly.

It is also possible to implement a radio module that can be used for both the slave and master side. That is, the module adds a radio port to the FRU ID, and it serves as the wireless gateway for the PDA. The module can use the CC1010 system-on-a-chip from Chipcon AS. This chip combines an industry-standard 8051 8-bit microcontroller with a 300-1000 MHz RF transceiver. The RF transceiver uses FSK modulation and provides data rates up to 77 Kbit/s. The antenna can be implemented as a dipole antenna using board traces. In one embodiment of the present invention, we operate the RF transceiver in the license-free 868 MHz band. Given the short range of the radio signal, power consumption is relatively low: the RF receiver consumes 12 mA and the RF transmitter consumes 17 mA at 1 mW transmitted power. The RF transceiver is designed for multi-channel and frequency hopping applications. This feature can be useful to bypass channels blocked by a faulty transceiver or rendered unusable due to interference.

The module can be used as follows. On the FRU, the module is interfaced with the serial EEPROM, creating a wireless FRU ID. The data contained in the FRU ID is replicated in the flash memory of the microcontroller. A snooping protocol that monitors the write operations on the interconnect between the FRU and FRU ID is used to keep data in both the flash memory and the FRU ID consistent. When FRU ID data is requested via the radio port, it is retrieved from the microcontroller's flash memory. By maintaining two separate copies of the FRU ID data, simultaneous accesses to the FRU ID through the wired interface and the radio port cannot conflict.

On the PDA side, the module acts as a wireless gateway by relaying packets between the wireless FRU ID and the serial port of the PDA. The PDA can then be used to query and display FRU ID data such as manufacturing records, diagnostic information, etc.

One embodiment of the present invention uses a simple request/acknowledge protocol. All data transfers are initiated by the master. We can extend this protocol such that a transfer can also be initiated by a slave, for example, to alert the master of an error condition.

Note that there are other possible means for coupling FRU IDs. One example is a mesh network that allows peer-to-peer communications.

Computer System

Figure 2:
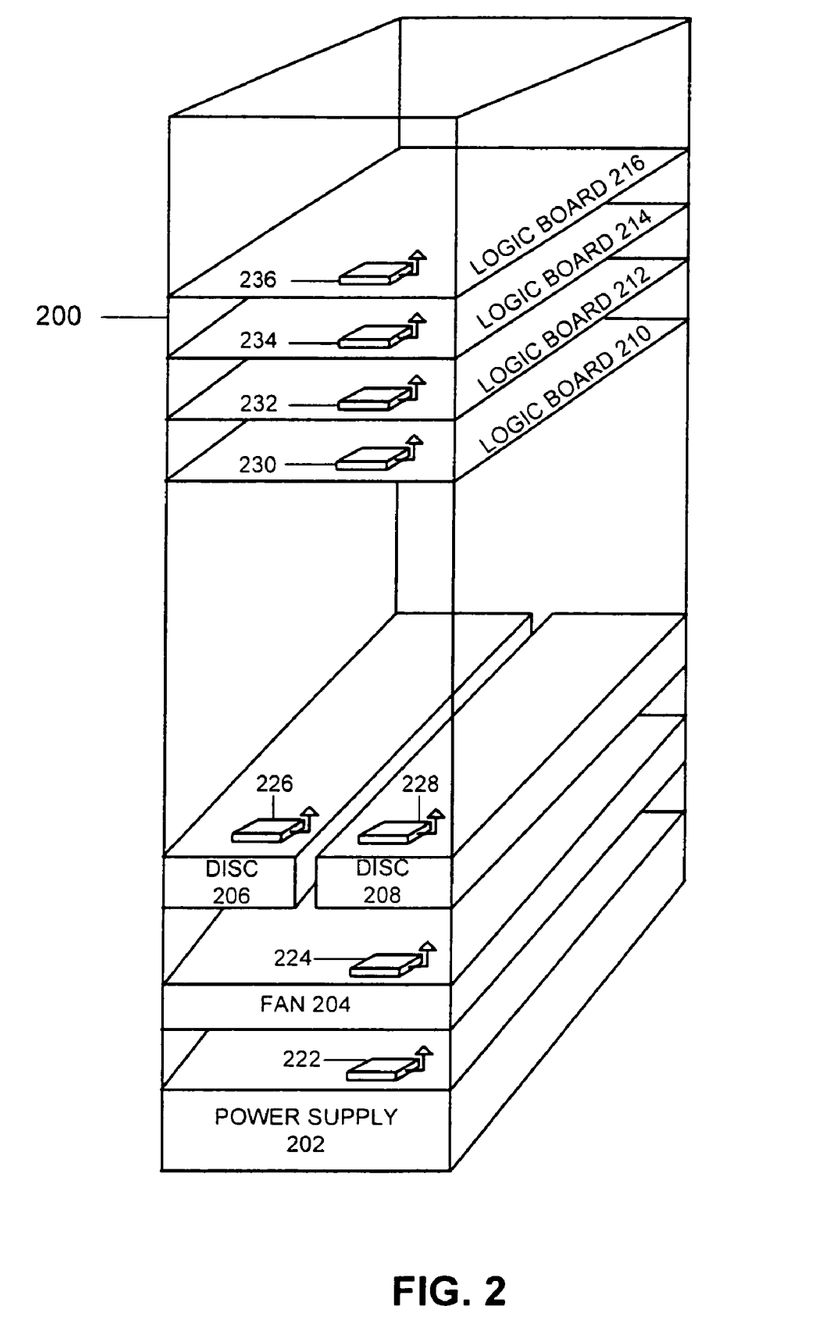
FIG. 2 illustrates a computer system in accordance with an embodiment of the present invention.

FIG. 2 illustrates a computer system 200 in accordance with an embodiment of the present invention. Computer system 200 includes power supply 202, fan assembly 204, discs 206 and 208, and logic boards 210, 212, 214, and 216. Power supply 202, fan assembly 204, discs 206 and 208, and logic boards 210, 212, 214, and 216 are each referred to as a field replaceable unit (FRU). FRUs are identified by a FRU ID. These FRUs of computer system 200 include FRU ID units 222, 224, 226, 228, 230, 232, 234, and 236, respectively.

A FRU ID is typically implemented with a serial EEPROM that contains information such as vendor information, a unique ID to identify the FRU, and the specifications of the FRU. This type of information is written into the EEPROM once, at manufacturing time. In addition, the EEPROM can also contain logging information that is continuously updated. Examples are error logs, or logs reporting physical parameters such as temperatures or voltages.

Note that the different types of data stored within the FRU IDs can be categorized as static or dynamic. Static data is stored once at manufacturing time. Examples of static data are vendor information, manufacturing information, and FRU specifications.

Dynamic data refers to data fields that may be modified, possibly multiple times. Examples of dynamic data are owner information, revision history, and system configuration information. Dynamic data can be updated either through a wired port or a wireless port on the FRU ID.

In some configurations, FRU IDs also receive and store telemetry data gathered by a network of sensors. This telemetry data may include temperature readings, voltage measurements, and current measurements. Additionally, the FRU ID can gather system error information, can log this error information, and can subsequently supply the error information to an external device through its wireless port.

Communicating with an External Device

FIG. 3 illustrates an external device communicating with a computer system in accordance with an embodiment of the present invention. As illustrated in FIG. 3, the external device can be personal digital assistant (PDA) 302. During operation, PDA 302 sends commands to and receives responses from FRU ID units 222, 224, 226, 228, 230, 232, 234, and 236. This technique allows a technician to determine the configuration of computer system 200 and to test computer system 200 without making physical connections to computer system 200.

Remote Access to Multiple Computer Systems

FIG. 4 illustrates a configuration that facilitates remote access to multiple computer systems in accordance with an embodiment of the present invention. These multiple computer systems include computer system 200 and computer system 400. Note that more than two computer systems can be supported with this configuration. Computer system 200, as described above in conjunction with FIG. 2, has been augmented with a bridge 438. Bridge 438 communicates with the FRU ID units within computer system 200 and, in turn, makes the data received from these FRU ID units available to external wireless networks such as a WiFi network or a cellular network.

Computer system 400 is configured similarly to computer system 200 and includes power supply 402, fan assembly 404, discs 406 and 408, and logic boards 410, 412, 414, and 416. Power supply 402, fan assembly 404, discs 406 and 408, and logic boards 410, 412, 414, and 416 are each referred to as a field replaceable unit (FRU). These FRUs of computer system 400 include FRU ID units 422, 424, 426, 428, 430, 432, 434, and 436, respectively. Note that computer system 400 and other computer systems can be configured in any manner acceptable for the computational objectives. Bridge 440 within computer system 400 serves the same purpose as bridge 438 in computer system 200.

Gateways 446 and 448 receive signals from bridges 438, 440, and any other bridges within range of gateways 446 and 448. Gateways 446 and 448 are coupled to router 444 and, through router 444 to network 442.

Network 442 can generally include any type of wire or wireless communication channel capable of coupling together computing nodes. This includes, but is not limited to, a local area network, a wide area network, or a combination of networks. In one embodiment of the present invention, network 442 includes the Internet.

The configuration illustrated in FIG. 4 allows remote access to computer systems 200 and 400 from any computer coupled to the Internet (not shown), which contains the appropriate software. This remote access provides a technician with the ability to determine the configuration of computer systems 200 and 400 and to execute system tests on these computer systems without visiting the site where the computers are located.

Traditional Wiring

Figure 5:
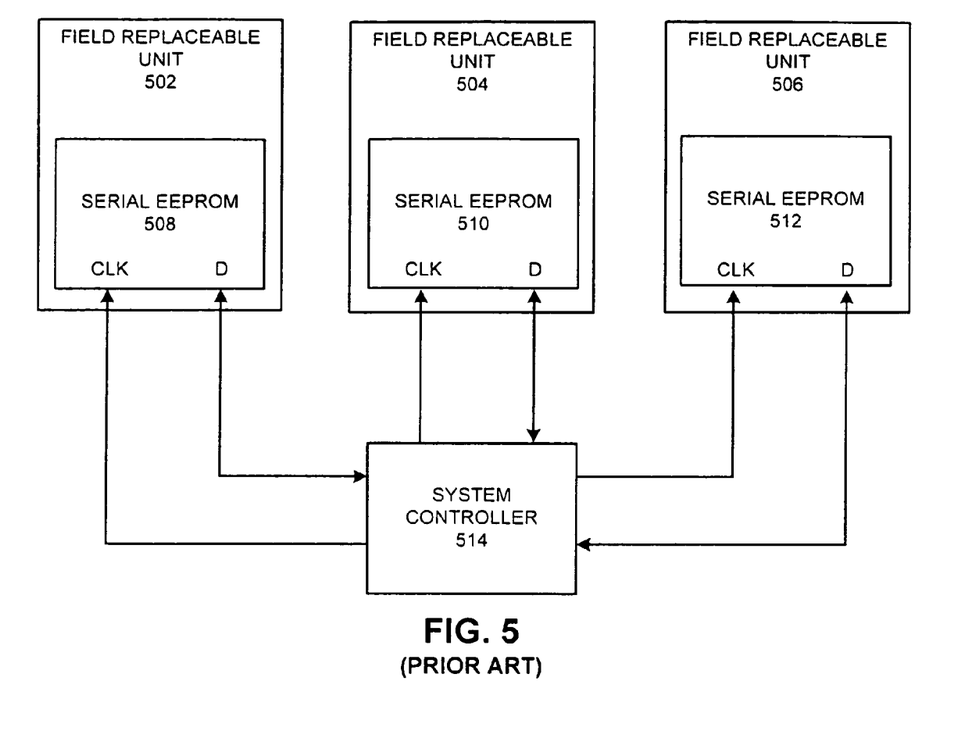
FIG. 5 illustrates the traditional wiring for identifying FRUs.

FIG. 5 illustrates the traditional wiring for identifying FRUs. The system illustrated in FIG. 5 includes FRUs 502, 504, and 506, which include serial EEPROMS 508, 510, and 512, respectively. System controller 514 employs serial wiring to each of the serial EEPROMS, wherein each serial EEPROM is coupled to system controller 514 by a clock wire and a data wire. The data wire transfers information such as commands, EEPROM addresses, and EEPROM data. This data is transferred bit-serially, whereby the clock wire provides the reference that specifies when the bits on the data wires are valid. Note that the serial EEPROMS are connected to system controller 514 by point-to-point wires.

Alternate Method of Traditional Wiring

Figure 6:
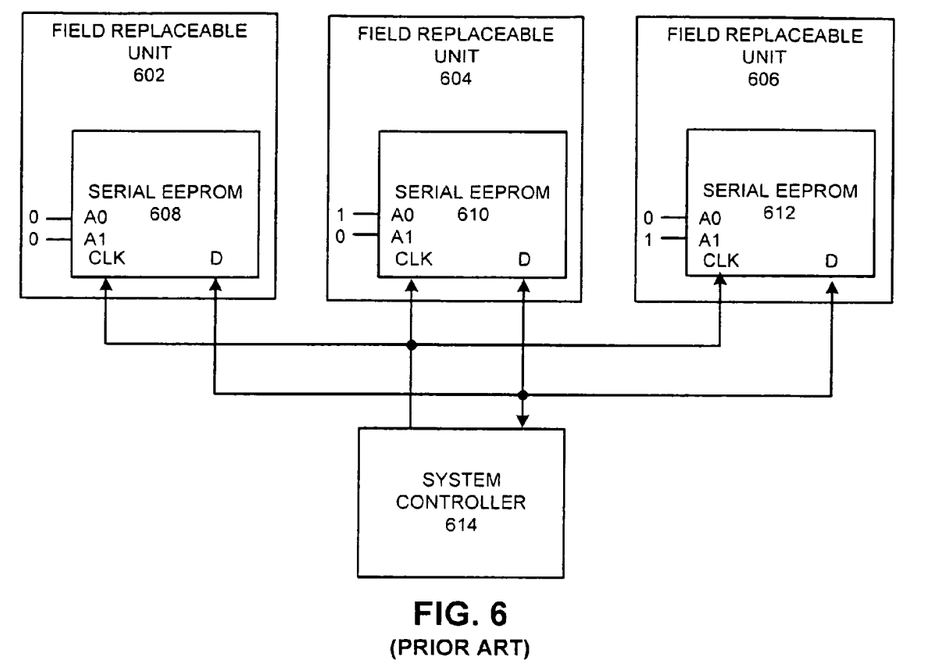
FIG. 6 illustrates an alternate wiring for identifying FRUs.

FIG. 6 illustrates an alternate wiring for identifying FRUs. In order to reduce the number of wires needed to connect the serial EEPROMS, some systems share wires as illustrated in FIG. 6. In this configuration, a serial bus connects the serial EEPROMs and the system controller. A specific EEPROM is selected when the device address received over the data wire matches the address supplied to the address pins of the EEPROM.

Wired and Wireless Connections

Figure 7A:
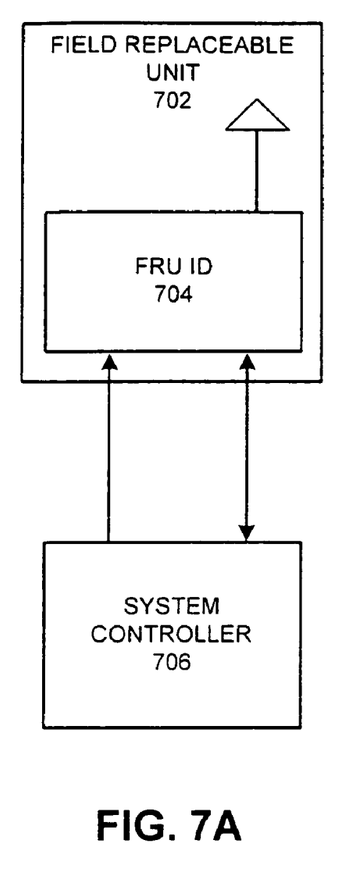
FIG. 7A illustrates circuitry for identifying a FRU with both traditional wiring and a wireless connection in accordance with an embodiment of the present invention.

FIG. 7A illustrates circuitry for identifying a FRU with both traditional wiring and a wireless connection in accordance with an embodiment of the present invention. In this configuration, FRU ID 704 located on FRU 702 is coupled to system controller 706 using traditional wiring. Additionally, FRU ID 704 includes a transceiver, which can communicate with an external device as described above or with a system controller that is equipped with a transceiver (not shown).

Wireless Connections Only

Figure 7B:
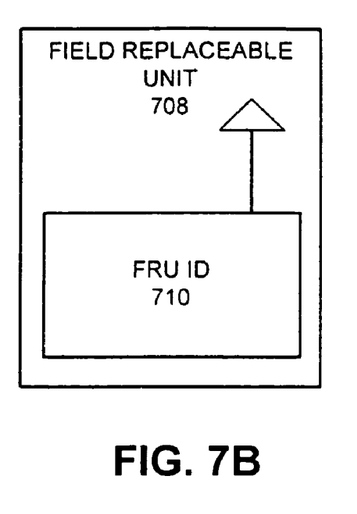
FIG. 7B illustrates a wireless connection for identifying a FRU in accordance with an embodiment of the present invention.

FIG. 7B illustrates a wireless connection for identifying a FRU in accordance with an embodiment of the present invention. FRU 708 includes FRU ID 710, which communicates with external devices or system controllers using the wireless transceiver within FRU ID 710.

Telemetry Harness

Figure 8:
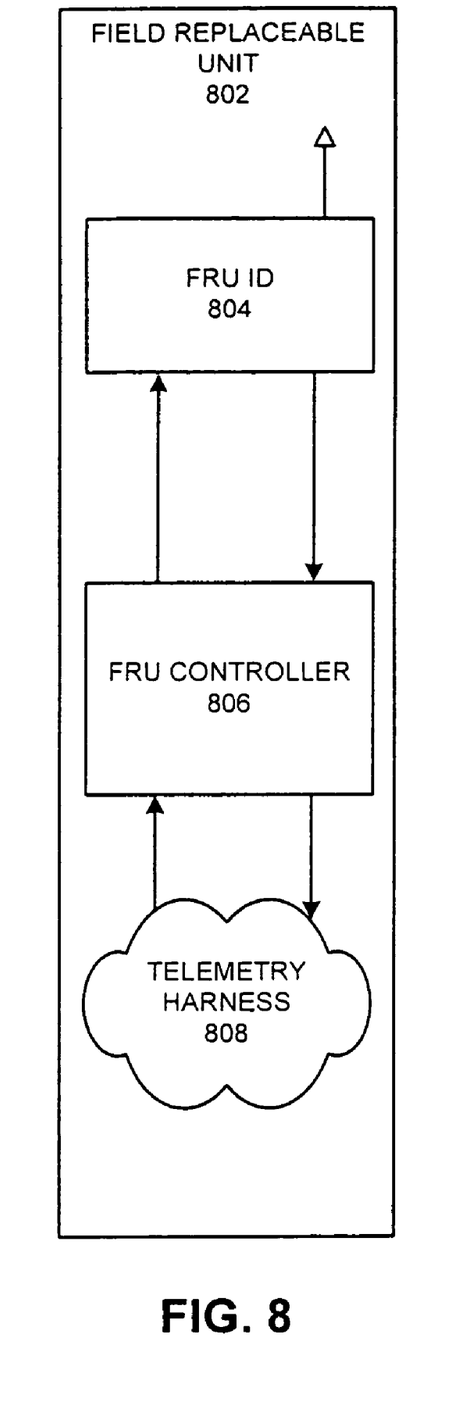
FIG. 8 illustrates a FRU controller coupled to a telemetry harness in accordance with an embodiment of the present invention.

FIG. 8 illustrates a FRU controller coupled to a telemetry harness in accordance with an embodiment of the present invention. FRU 802 includes FRU ID 804, FRU controller 806, and telemetry harness 808. FRU controller 806 is coupled to telemetry harness 808 and stores the telemetry data into FRU ID 804.

FRU IDs contain different types of data that can be categorized as static or dynamic. Static data is stored once at manufacturing time. Examples of static information are vendor information, manufacturing information, and FRU specifications. Dynamic data refers to data fields that may be modified, possibly multiple times. Examples of dynamic data are owner information, revision history, and system configuration. Dynamic data could be written either through a wired or a wireless port of the FRU ID. In some applications, FRU IDs also store telemetry data gathered by a network of sensors. This is shown in FIG. 8 where a FRU controller connects to a telemetry harness and stores the telemetry data in the FRU ID. Telemetry data may include temperature readings, voltage, and current measurements. Similarly, the FRU controller could also gather error information such as checksum errors observed when data is transferred over data paths or retrieved from memories, and log this information in the FRU ID.

FRU ID Unit

Figure 9:
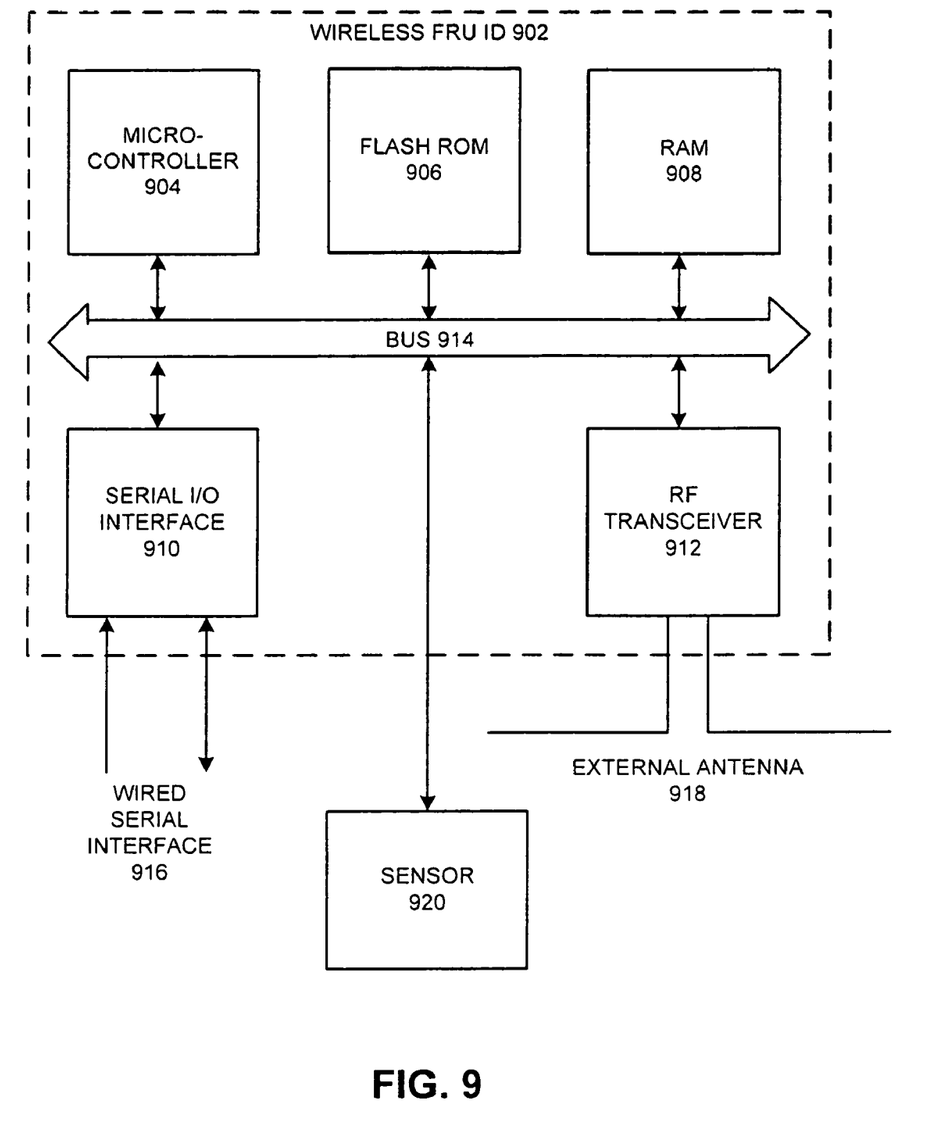
FIG. 9 illustrates a block diagram of a wireless FRU ID unit in accordance with an embodiment of the present invention.

FIG. 9 illustrates a block diagram of a wireless FRU ID unit 902 in accordance with an embodiment of the present invention. FRU ID 902 includes micro-controller 904, flash ROM 906, RAM 908, serial I/O interface 910, RF transceiver 912, and BUS 914. Micro-controller 904 is a computing device, which controls the operation of FRU ID 902. Micro-controller 904 communicates with flash ROM 906, RAM 908, serial I/O interface 910, RF transceiver 912, and external sensor 920 over bus 914. Bus 914 is a communication bus configured to operate in conjunction with the various components coupled to bus 914.

Serial I/O interface 916 couples external signals into and out of FRU ID 902 to gather external data and/or to communicate with a wired FRU controller. Sensor 920 can include a device or devices to measure temperature, voltage, and/or current. Note that multiple sensors can be coupled to bus 914 and that these sensors can be configured to measure parameters other than temperature, voltage, and current. External antenna 918 couples RF signals between RF transceiver 912 and external devices or wireless controllers.

Typical characteristics of such a system are: 8-bit micro-controller (e.g. 8051), 32 Kbyte flash ROM, 2 Kbyte RAM, and a 20-100 Kbit/s RF transceiver operating in a license-free band (e.g. 916 MHz or 2.4 GHz).

Wireless FRU IDs might use battery power rather than the system power supplied to the FRU. This way, the wireless FRU ID is operational even if system power is not available.

Wireless FRU IDs might also have the capability to be powered by the electromagnetic (EM) field—this power source is, for example, used by RFID tags. A wireless FRU ID might then operate in two modes: Full functionality is available as long as system power is available and limited functionality is provided when system power is unavailable and power is provided by the EM field. Limited functionality may provide access to only certain fields in the FRU ID information.

In addition to applications involving monitoring, testing, diagnosing, and configuring associated FRUs, wireless FRU IDs can be used for applications that require tracking of components. For example, FRU ID information can be accessed on the manufacturing floor to automate the "build-to-order" process. As a further example, wireless FRU IDs can be used in the field, at the customer site, for inventory control.

Identifying a FRU

Figure 10:
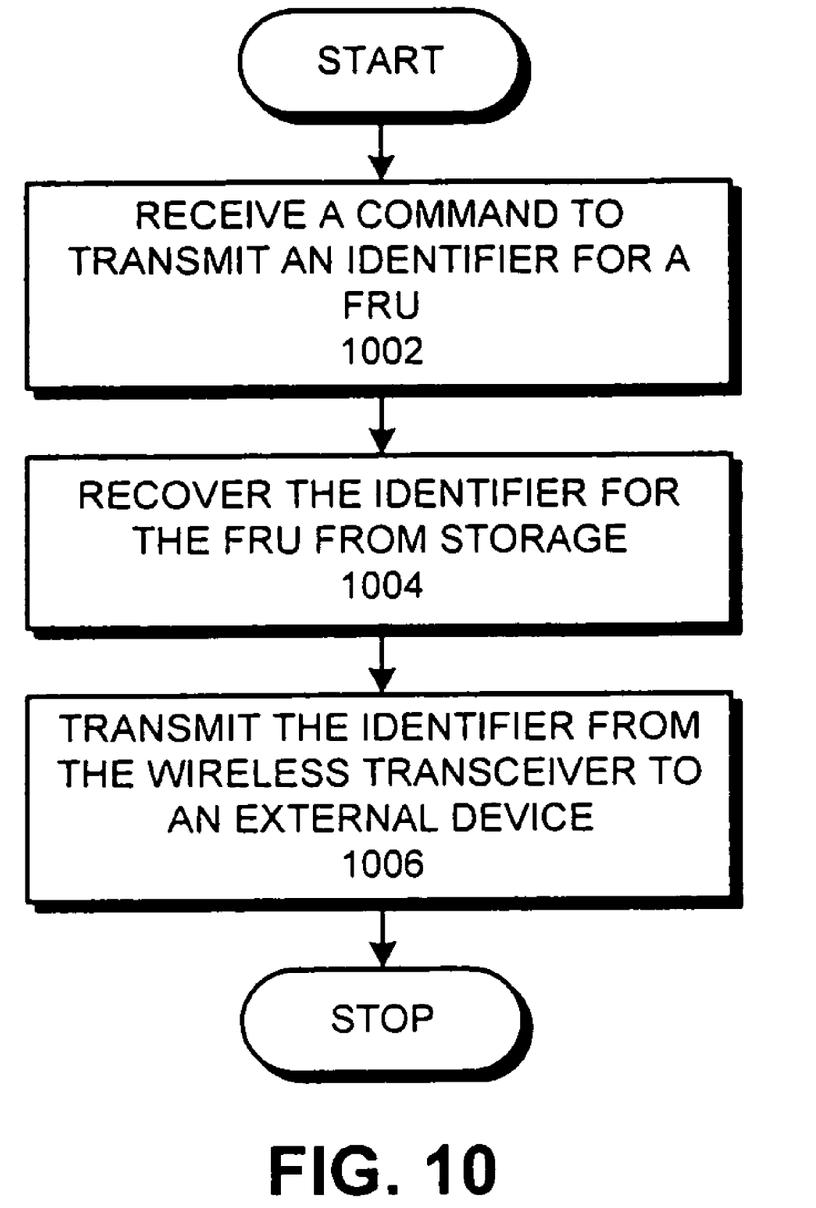
FIG. 10 presents a block diagram of the process of identifying a FRU in accordance with an embodiment of the present invention.

FIG. 10 presents a block diagram of the process of identifying a FRU in accordance with an embodiment of the present invention. The system starts when a FRU ID receives a command to transmit an identifier for the FRU (step 1002.). Next, the FRU ID recovers the identifier for the FRU from the onboard ROM (step 1004). Finally, the FRU ID transmits the identifier from the wireless transceiver to the requesting device (step 1006).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for wirelessly identifying and testing field-replaceable units within a computer system, comprising:
    a field-replaceable unit (FRU) within the computer system;
    a storage device located on the FRU, which contains an identifier for the FRU;
    a wireless transceiver coupled to the storage device, wherein the wireless transceiver is located on the FRU, wherein the wireless transceiver is configured to receive a request directed to the FRU and, in response to the request, to transmit the identifier for the FRU; and
    at least one physical sensor coupled to the wireless transceiver, wherein the at least one physical sensor is located on the FRU, and wherein the at least one physical sensor is configured to monitor temperature, voltage, or current for the FRU.

2. The apparatus of claim 1, wherein the wireless transceiver is additionally configured to transmit data associated with the FRU.

3. The apparatus of claim 1, wherein the storage device includes a serial electrically-erasable programmable read-only memory.

4. The apparatus of claim 1, wherein data on the storage device contains error logs for the FRU.

5. The apparatus of claim 1, wherein the at least one physical sensor creates a log of the monitored parameter within the storage device.

6. The apparatus of claim 1, wherein the wireless transceiver initiates a wireless transfer when the at least one physical sensor measures a data reading that exceeds a given range.

7. The apparatus of claim 1, wherein the storage device and wireless transceiver receive power from a power source for the FRU.

8. The apparatus of claim 1, wherein the storage device and wireless transceiver receive power from a battery, which is separate from the power source for the FRU.

9. The apparatus of claim 1, wherein the storage device and wireless transceiver receive power from a radio frequency signal received by the wireless transceiver.

10. The apparatus of claim 1, further comprising a joint test action group (JTAG) interface coupled to the wireless transceiver configured to test the FRU under control of signals received by the wireless transceiver.

11. The apparatus of claim 1, wherein data within the storage device is updated using the transceiver.

12. A computer system for wirelessly identifying and testing field-replaceable units within the computer system, comprising:
    a plurality of field-replaceable units, wherein a field-replaceable unit (FRU) of the plurality of field-replaceable units includes:
        a storage device located on the FRU, which contains an identifier for the FRU;
        a wireless transceiver coupled to the storage device, wherein the wireless transceiver is located on the FRU, wherein the wireless communication is configured to receive a request directed to the FRU and, in response to the request, to transmit the identifier for the FRU; and
        at least one physical sensor coupled to the wireless transceiver, wherein the at least one physical sensor is located on the FRU, and wherein the at least one physical sensor is configured to monitor temperature, voltage, or current for the FRU.

13. The computer system of claim 12, wherein the wireless transceiver is additionally configured to transmit data associated with the FRU.

14. The computer system of claim 12, wherein data on the storage device contains error logs for the FRU.

15. The computer system of claim 12, wherein the storage device includes a serial electrically-erasable programmable read-only memory.

16. The computer system of claim 12, wherein the at least one physical sensor creates a log of the monitored parameter within the storage device.

17. The computer system of claim 12, wherein the wireless transceiver initiates a wireless transfer when the at least one physical sensor measures a data reading that exceeds a given range.

18. The computer system of claim 12, wherein the storage device and wireless transceiver receive power from a power source for the FRU.

19. The computer system of claim 12, wherein the storage device and wireless transceiver receive power from a battery, which is separate from the power source for the FRU.

20. The computer system of claim 12, wherein the storage device and wireless transceiver receive power from a radio frequency signal received by the wireless transceiver.

21. The computer system of claim 12, further comprising a joint test action group (JTAG) interface coupled to the wireless transceiver configured to test the FRU under control of signals received by the wireless transceiver.

22. A method for wirelessly identifying and testing field-replaceable units within a computer system, comprising:
    receiving a command at a wireless transceiver coupled to a field-replaceable computer unit (FRU) to transmit an identifier for the FRU, wherein the wireless transceiver is located on the FRU;
    recovering the identifier for the FRU from a storage device located on the FRU; and
    transmitting the identifier from the wireless transceiver, whereby the identifier can be received by the external device; and
    monitoring temperature, voltage, or current for the FRU using an at least one physical sensor coupled to the wireless transceiver, wherein the at least one physical sensor is located on the FRU.

23. The method of claim 22, further comprising creating a log of the monitored parameter within the storage device.

24. The method of claim 22, further comprising testing the FRU under control of signals received by the wireless transceiver using a joint test action group (JTAG) interface coupled to the wireless transceiver.

* * * * *